Sept. 22, 1953     H. S. KAWECKI ET AL     2,653,197
PARKING BRAKE INDICATOR LIGHT
Filed Dec. 18, 1950
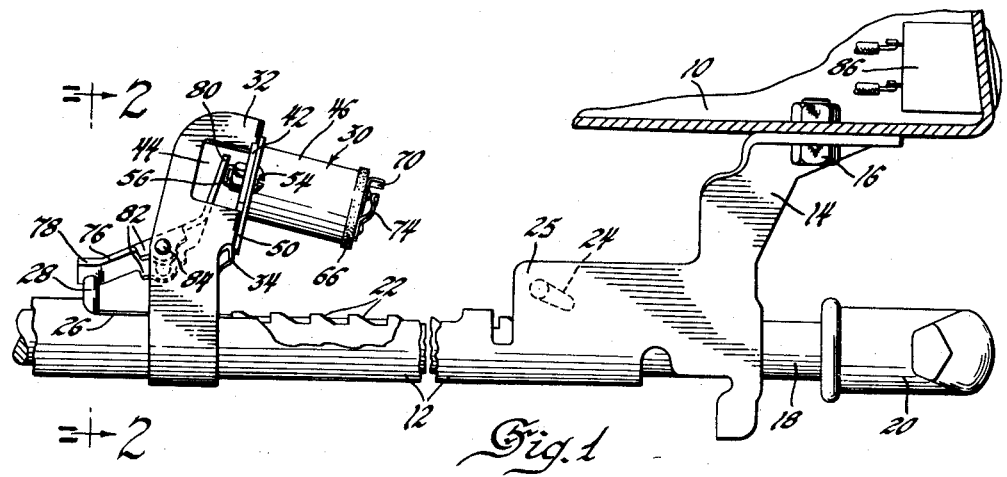
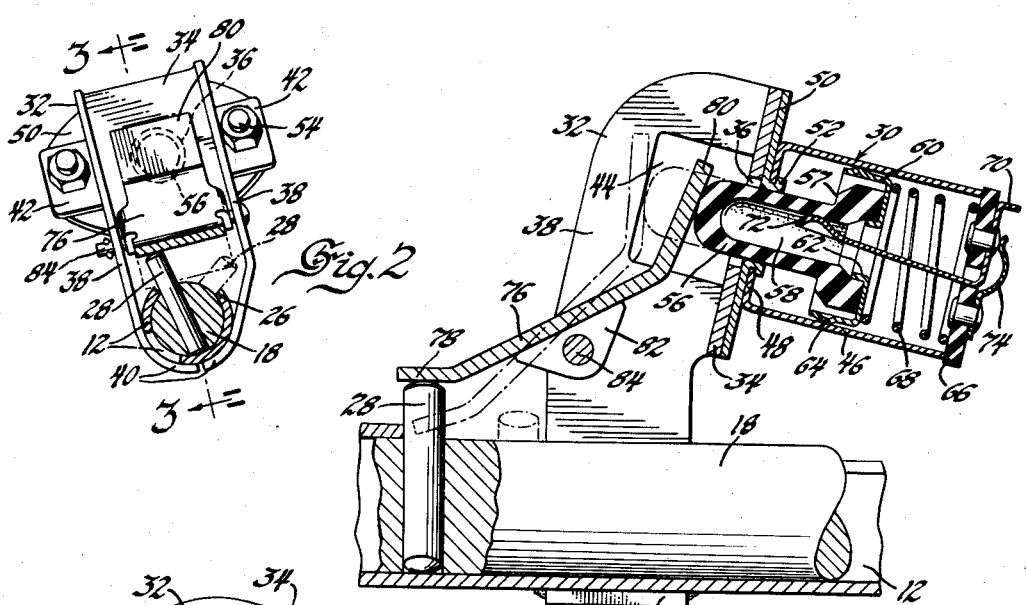
Inventors
Henry S. Kawecki &
Chester J. Glowzinski
Attorneys Patented Sept. 22, 1953

2,653,197

UNITED STATES PATENT OFFICE 2,653,197

PARKING BRAKE INDICATOR LIGHT

Henry S. Kawecki, Ortonville, and Chester J. Glowzinski, Detroit, Mich., assignors to General Motors Corporation, Detroit, Mich., a corporation of Delaware Application December 18, 1950, Serial No. 201,408

9 Claims. (Cl. 200—61.87)

1

This invention relates to an improved brake indicating means and particularly to an improved switch actuating mechanism for a hand brake indicating light.

In the operation of an automotive vehicle the operator often fails to release the hand brake lever when he starts. The resulting overheating and excessive wear of the brakes are objectionable and dangerous. Several systems have been devised to warn the operator that the hand brakes are applied so that he will release the brakes before they are damaged by operating the vehicle when the brakes are applied. One of these systems employed an electric warning light which is connected through the ignition switch and a brake lever actuated switch to light the warning light when the ignition is turned on and the brakes are set. In accordance with the present invention an improved mechanism for operating and supporting the brake actuated switch is mounted on the brake pull rod assembly. The switch and a pivoted actuating lever are mounted on a support secured to the brake tube. The brake pull rod is reciprocably and rotatably mounted in the brake tube and has a pin positioned on the pull rod to engage the pivoted actuating lever to actuate the brake warning light switch.

The primary object of the invention is to provide an improved and simplified actuating mechanism for a hand brake warning light actuated by a pull rod type hand brake assembly.

Another object of the invention is to provide an improved and easily assembled single lever interconnection between a hand brake lever and an actuator switch for a hand brake warning light.

Another object of the invention is to provide in a pull rod type hand brake controlling mechanism having a guide pin in the rod, a pivoted switch actuating lever cooperating with a switch to illuminate a hand brake warning signal light.

Further objects and advantages of the present invention will be apparent from the following description and accompanying drawing of a preferred embodiment.

Figure 1 is a partial view of a hand brake pull rod showing the invention with parts broken away to show certain details.

Figure 2 is a section of Figure 1 on the line 2—2.

Figure 3 is a partial enlarged view of Figure 1 showing the details of the lever and switch.

Figure 4 is a partial enlarged view of Figure 1 showing the lever and switch in another position of operation.

The invention is illustrated in conjunction with a pull type hand brake mechanism mounted under the instrument panel 10 of an automotive vehicle. The hand brake pull rod mechanism consists of

2 a tubular support 12 having an upwardly extending bracket 14 at the forward end of the support tube. The bracket is secured by suitable means such as bolt 16 to the instrument panel 10. The other or rear end of the support tube 12, though not shown, is suitably secured to the dash panel of the automotive vehicle by suitable means such as a bracket or a collar. Thus the instrument and dash panel structure of the automotive vehicle provides a support for this mechanism. The pull rod 18 is rotatably and reciprocably mounted within the support tube 12. The pull rod has a handle 20 at the forward end beneath the instrument panel bracket 14 and has an aligned series of ratchet teeth 22 positioned along the top central portion and at the rear end is connected in the conventional manner (not shown) by suitable cables or linkage to the brakes. A conventional spring-pressed pawl 24 is pivotally mounted on and between opposed parallel walls 25 of the lower portion of the bracket 14 and engages the teeth 22 to hold the pull rod 18 in any applied position. A slot 26 is formed at the top surface of the support tube 12 to function in cooperation with the pin 28 to limit the rotary movement and the reciprocating movement of the pull rod 18.

The hand brake warning light switch 30 is secured to a support 32 attached to the support tube 12 adjacent the rear end of the slot 26. The support 32 is formed of sheet metal and has a central plate portion 34 which has a generally rectangular shape and a suitable recess 36 extending inwardly from the lower edge of the plate to provide an aperture for the switch button as explained below. On each side of the plate 34 a pair of integral legs 38 are positioned at right angles to the plate and extend downwardly below the plate and parallel to each other. The lower ends of each of the legs 38 are bent inwardly to form a circular portion 40 which engages and seats on the support tube 12. The support 32 is secured to the support tube 12 by suitably welding the circular portions 40 of the legs to the support tube. In order to form the ears 42, U-shaped slits are formed in the legs on opposite sides of the recess 36 with the ends of the U-shaped slits in the fold between the plate 34 and the legs 38. The leg portion within the U-shaped slit is then bent outwardly into the plane of the plate portion 34 to provide ears 42. This arrangement leaves an aperture 44 in the leg portions adjacent the plate.

The switch 30 has a generally cylindrical body 46 having an internal flange 48 at one end forming a reduced aperture. The generally elliptical mounting plate 50 has a central aperture with a flange 52 rolled inside the flange 48 to secure the mounting plate to the switch body 46. The mounting plate 50 is positioned on the bracket with the long diameter portions over the ears 42 of the support and both the mounting plate 50 and the ears 42 are apertured to receive suitable securing means such as the bolts 54 to secure the switch to the support. The operating button 56 for the switch consists of a hollow cylindrical member made of insulating material. The outer or actuating end of the button is solid and an internal recess 58 opens at the inside end of the button member 56. The button slides in the aligned apertures in the mounting plate and the cylindrical body and is retained in the housing by shoulder 57 at the inner end of the button. An annular channel shaped contact member 60 is secured to the inner end of the button member 56 with the inner flange 62 gripping the inside of the recess 58 and the outer flange 64 engaging the body 46 for electrical contact and to guide the button as it reciprocates in the housing. The rear end of the body 46 is closed by a cover 66 of insulating material. A coil spring 68 positioned between the cover 66 and the channel member 60 holds the switch button 56 in its outer position in which the switch is closed. The terminal 70 of the switch is suitably secured to the cover 66 and has a resilient finger 72 extending into the recess 58 in the button 56. Since this button 56 is made of insulating material, the switch will be opened when the button is pressed inward and the finger 72 is in contact with the insulating material and the switch will be closed to conduct electricity when the button 56 is extended and the finger 72 engages the inner flange 62 of the channel 60. The resilient terminal clamp 74 may be secured in the cover 66 to hold the electrical conductor in contact with the terminal 70. Only one terminal is employed since the return circuit is through the grounded housing 46.

The switch 30 is actuated by a lever 76 pivotally mounted on the support 32. The lever 76 has a general bell-crank configuration with the pin 28 contacting terminal portion 78 and the switch button 56 contacting terminal portion 80. The terminal portions of the lever 76 are flat and are located substantially at right angles to each other. At the center of the lever 76 a pair of generally triangular shaped ears 82 are formed integral with the lever and bent at right angles to the face of the lever and parallel to each other. The ears 82 and the leg portions 38 of the support 32 are suitably apertured to receive the lever pivot 84.

The warning switch 30 may be suitably connected through the ignition switch to actuate the warning light 86 mounted on the instrument panel 10. The ignition switch may also be included in the warning signal circuit so that the signal is not operated when the vehicle is parked with the ignition off.

The hand brake pull rod 18 is actuated in the conventional manner by means of the handle 20. When the brake rod is actuated the pin 28 is moved axially of the rod to the right in Figure 1 from the released to the applied position. When the pin 28 moves to the right it disengages the terminal portion 78 of the lever 76 and allows the lever to be moved by the switch button 56 and spring 68 from the solid line position through the dash and dot line position shown in Figure 3. This movement of the lever allows the switch button 56 to move outwardly under the influence of spring 68 and permits the engagement of the contact finger 72 with the contact ring flange 62 (Fig. 4) to close the switch 30 and actuate the warning light 86 if the ignition switch is closed. In order to release the brakes, the handle is rotated in a clockwise direction as viewed in Figure 2 to move the ratchet teeth 22 from underneath the pawl 24. The pin 28 will then be in a dotted line position as illustrated in Figure 2. Under the influence of the brake retraction springs, the pull rod 18 is drawn inwardly until the pin 28 engages the rear end of the slot 26. Suitable cam or spring means, not shown, are employed to return the rod 18 to the position in which the pawl 24 will engage the ratchet teeth 22. In this position the pin 28 will engage the lower end 78 of the lever 76 shown in Figures 2 and 3 to open switch 30. The switch terminal 80 of this lever engages abutment 56 and moves it into the switch housing 46. Due to this movement of the switch button 56, the spring finger 72 disengages the channel 62 to disconnect the electrical circuit to the warning light 86. The conventional grounded single wire automotive type of circuit may be used. The circuit would consist of a single wire from the battery to the signal light 86, to the ignition switch and to signal switch 30 to ground such as the vehicle frame.

The above detailed description of the preferred embodiment of the invention is to be considered illustrative of the invention which may be modified within the scope of the appended claims.

We claim:

1. In a hand brake warning system, a tubular supporting bracket, a hand brake actuating rod mounted for reciprocation and rotation in said tubular supporting bracket, means on said rod and said tubular bracket to limit the reciprocation between a released position at one end and an applied position at the other end and rotation between a detent engaged and disengaged position of said actuating rod, a support secured to said tubular bracket transversely of said tubular bracket between said released and applied position, a switch attached to said support and having an actuating button, said switch being connected when said button is extended, a bell crank lever pivoted to said support with one end engaging said switch button to disconnect said switch and the other end engaging said means on said rod to limit the reciprocation when the rod is in the released position.

2. In a hand brake warning system, a tubular supporting bracket, a hand brake actuating rod mounted for reciprocation and rotation in said tubular supporting bracket, means on said rod and said bracket to limit the reciprocation between a released position at one end and an applied position at the other end and rotation between a detent engaged and disengaged position of said actuating rod, a support having a face plate with an aperture, means to secure said tubular bracket to said plate transversely of said tubular bracket between said released and applied position, a switch attached to said plate and having a button extending through said aperture, said switch being connected when said button is extended, a bell crank lever pivoted to said support with one end engaging said switch button to disconnect said switch and the other end engaging said means on said rod to limit reciprocation when the rod is in the released position.

3. In a hand brake warning system, a tubular supporting bracket, a hand brake actuating rod mounted for reciprocation and rotation in said tubular supporting bracket, means on said rod and said bracket to limit the reciprocation between a released position at one end and an applied position at the other end and rotation between a detent engaged and disengaged position of said actuating rod, a support having a flat face plate with an aperture and a pair of legs integral with each side of said plate and positioned at right angles to the plate and extending laterally, said legs being secured to said tubular bracket to support said plate transversely of said tubular bracket between said released and applied position, a cut-out portion of said legs positioned in the plane of said plate to provide ears, a switch attached to said ears and having a button extending through said aperture, said switch being connected when said button is extended, a bell crank lever pivoted to said legs with one end engaging said switch button to disconnect said switch and the other end engaging said means when the rod is in the released position.

4. In a hand brake warning system, a tubular supporting bracket, a hand brake actuating rod mounted for reciprocation and rotation in said tubular supporting bracket, a slot in said tubular bracket, a pin in said rod extending through said slot to limit the reciprocation between a released position at one end and an applied position at the other end and rotation between a detent engaged and disengaged position of said actuating rod, a support having a flat face plate with an aperture and a pair of legs integral with each side of said plate and positioned at right angles to the plate and extending laterally, said legs being secured to said tubular bracket to support said plate transversely of said tubular bracket between said released and applied position, a switch attached to said plate and having a button extending through said aperture, said switch being connected when said button is extended, a bell crank lever pivoted to said legs with one end engaging said switch button to disconnect said switch and the other end engaging said pin when the rod is in the released position.

5. In a hand brake warning system, a tubular supporting bracket, a hand brake actuating rod mounted for reciprocation and rotation in said tubular supporting bracket, a slot in said tubular bracket, a pin in said rod extending through said slot to limit the reciprocation between a released position at one end and an applied position at the other end and rotation between a detent engaged and disengaged position of said actuating rod, a support having a flat face plate with an aperture and a pair of legs integral with each side of said plate and positioned at right angles to the plate and extending laterally, said legs being secured to said tubular bracket to support said plate transversely of said tubular bracket between said released and applied position, a cut-out portion of said legs positioned in the plane of said plate to provide ears, a switch attached to said ears and having a button extending through said aperture, said switch being connected when said button is extended, a bell crank lever pivoted to said legs with one end engaging said switch button to disconnect said switch and the other end engaging said pin when the rod is in the released position.

6. In a hand brake warning system, a tubular supporting bracket, a hand brake actuating rod mounted for reciprocation and rotation in said tubular supporting bracket, a slot in said tubular bracket, a pin in said rod extending through said slot to limit the reciprocation between a released position at one end and an applied position at the other end and rotation between a detent engaged and disengaged position of said actuating rod, a support having a flat face plate with an aperture and a pair of legs integral with each side of said plate and positioned at right angles to the plate and extending laterally, the extremities of said legs being in contact with and secured to said tubular bracket to support said plate transversely of said tubular bracket between said released and applied position, a cut-off portion of said legs positioned in the plane of said plate to provide ears, a switch attached to said ears and having a button extending through said aperture, said switch being connected when said button is extended, a bell crank lever pivoted to said legs with one end engaging said switch button to disconnect said switch and the other end engaging said pin when the rod is in the released position.

7. In a hand brake warning system, a supporting bracket, a hand brake actuating rod mounted for reciprocation in said supporting bracket, said rod being reciprocable between a released position at one end and an applied position at the other end, limit means on said rod and said bracket to limit the reciprocating movement of said rod in said supporting bracket, a support secured to said bracket, a switch attached to said support and having actuating means actuated by said limit means to disconnect said switch when the rod is in released position.

8. In a hand brake warning system, a tubular supporting bracket, a hand brake actuaitng rod mounted for reciprocation in said tubular supporting bracket, said rod being reciprocable between a released position at one end and an applied position at the other end, limit means on said rod and said tubular bracket to limit the reciprocating movement of said rod in said tubular supporting bracket, a support secured to said tubular bracket, a switch attached to said support and having an actuating member, means on said support actuated by said limit means to disconnect said switch when the rod is in the released position.

9. In a hand brake warning system, a tubular supporting bracket, a hand brake actuating rod mounted for reciprocation and rotation in said tubular supporting bracket, means on said rod and said tubular bracket to limit the reciprocation between a released position at one end and an applied position at the other end and rotation between a detent engaged and disengaged positions of said actuating rod, a support secured to said tubular bracket transversely of said tubular bracket between said released and applied position, a switch attached to said support and having an actuating button, and means mounted on said support with one part engaging said switch button to actuate said switch and another part engaging said means on said rod to limit reciprocation when the rod is in the released position.

HENRY S. KAWECKI.
CHESTER J. GLOWZINSKI.

References Cited in the file of this patent

UNITED STATES PATENTS

| Number | Name | Date |
|---|---|---|
| 1,295,950 | Zabel | Mar. 4, 1919 |
| 2,006,690 | Blake | July 2, 1935 |
| 2,241,277 | Snover | May 6, 1941 |